(12) United States Patent
Dlugosch et al.

(10) Patent No.: US 8,489,534 B2
(45) Date of Patent: Jul. 16, 2013

(54) ADAPTIVE CONTENT INSPECTION

(76) Inventors: Paul D. Dlugosch, Eagle, ID (US);
Harold B Noyes, Boise, ID (US)

( * ) Notice: Subject to any disclaimer, the term of this patent is extended or adjusted under 35 U.S.C. 154(b) by 657 days.

(21) Appl. No.: 12/638,767

(22) Filed: Dec. 15, 2009

(65) Prior Publication Data

US 2011/0145182 A1      Jun. 16, 2011

(51) Int. Cl.
*G06F 17/18*      (2006.01)
(52) U.S. Cl.
USPC .............................. 706/46; 715/771; 709/224
(58) Field of Classification Search
None
See application file for complete search history.

(56) References Cited

U.S. PATENT DOCUMENTS

| | | | |
|---|---|---|---|
| 5,300,830 A | 4/1994 | Hawes | |
| 5,331,227 A | 7/1994 | Hawes | |
| 6,240,003 B1 | 5/2001 | McElroy | |
| 6,880,087 B1 | 4/2005 | Carter | |
| 6,906,938 B2 | 6/2005 | Kaginele | |
| 6,944,710 B2 | 9/2005 | Regev et al. | |
| 7,089,352 B2 | 8/2006 | Regev et al. | |
| 7,146,643 B2 | 12/2006 | Dapp et al. | |
| 7,392,229 B2 | 6/2008 | Harris et al. | |
| 2004/0044907 A1 | 3/2004 | Sun | |
| 2006/0136570 A1* | 6/2006 | Pandya | 709/217 |
| 2007/0075878 A1 | 4/2007 | Furodet et al. | |
| 2007/0127482 A1 | 6/2007 | Harris et al. | |
| 2007/0282833 A1 | 12/2007 | McMillen et al. | |
| 2009/0141634 A1 | 6/2009 | Rothstein et al. | |
| 2010/0115621 A1* | 5/2010 | Staniford et al. | 726/25 |

FOREIGN PATENT DOCUMENTS

| | | |
|---|---|---|
| EP | 1006701 | 6/2000 |
| EP | 2018013 | 1/2009 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.
Clark, C. et al.; Scalable Pattern Matching for High Speed Networks; Proceedings of the 12th Annual IEEE symposium on Field-Programmable Custom Computing Machines (FCCM'04);Georgia Institute of Technology; pp. 1-9; 2004.

(Continued)

*Primary Examiner* — Kakali Chaki
*Assistant Examiner* — Kalpana Bharadwaj
(74) *Attorney, Agent, or Firm* — Fletcher Yoder

(57) ABSTRACT

Methods and apparatus are provided involving adaptive content inspection. In one embodiment, a content inspection processor may identify information with respect to input data and provide the information to a host controller. The host controller may adapt search criteria or other parameters and provide the adapted parameter to the content inspection processor. Other embodiments may include a content inspection processor having integrated feedback, such that results data is fed back to the content inspection processor. The results data may be processed before being provided to the content inspection processor.

28 Claims, 5 Drawing Sheets

OTHER PUBLICATIONS

Fide, S.; String Processing in Hardware; Scalable Parallel and Distributed Systems Lab; Proceedings of the 12$^{th}$ Annual IEEE symposium on Field-Programmable Custom Computing Machines (FCCM'04);School of Electrical and Computer Engineering; Georgia Institute of Technology; pp. 1-9; 2004.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-192; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

* cited by examiner

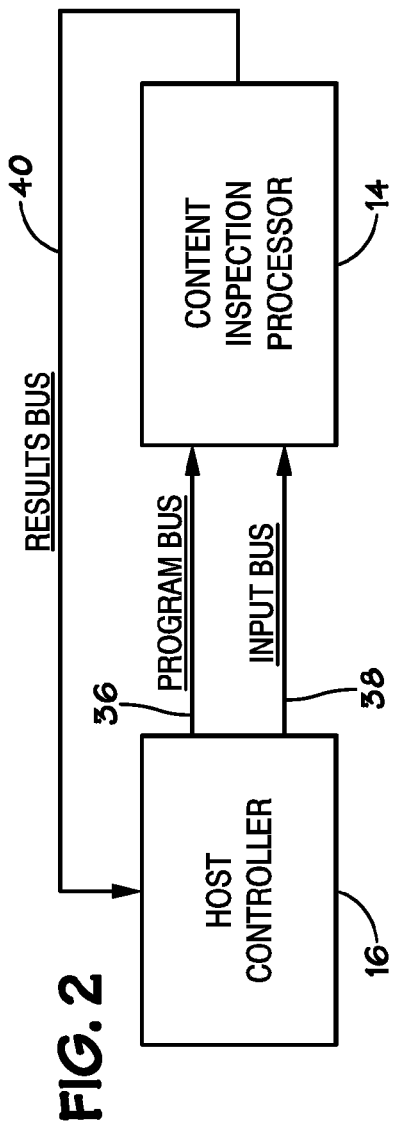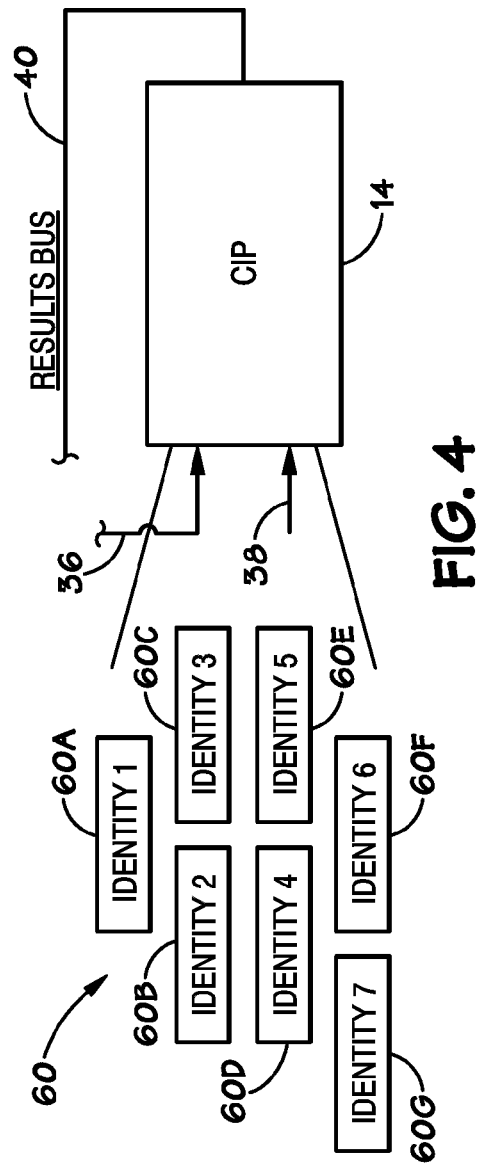

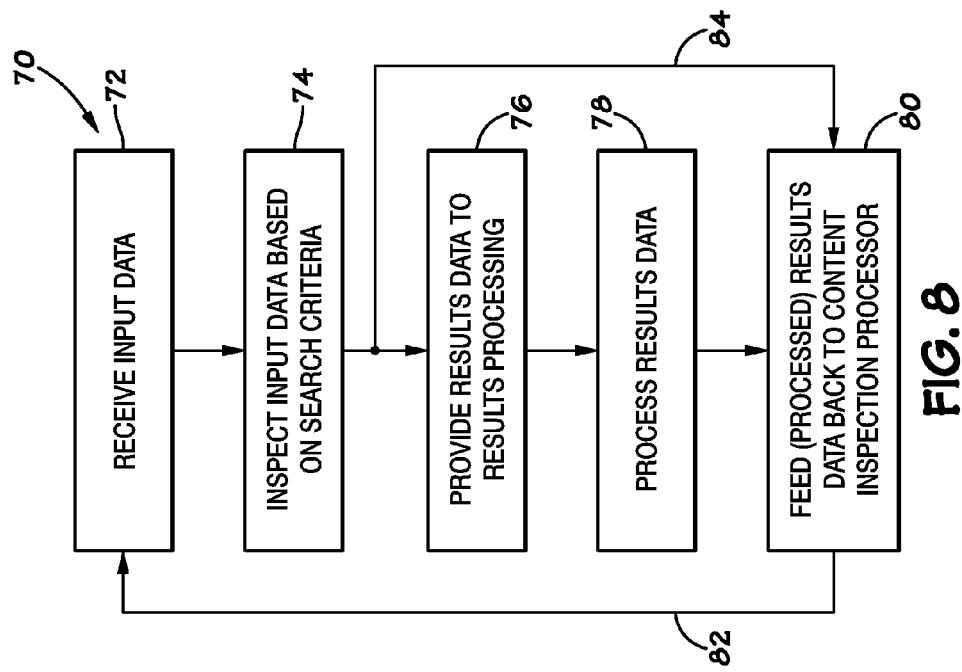

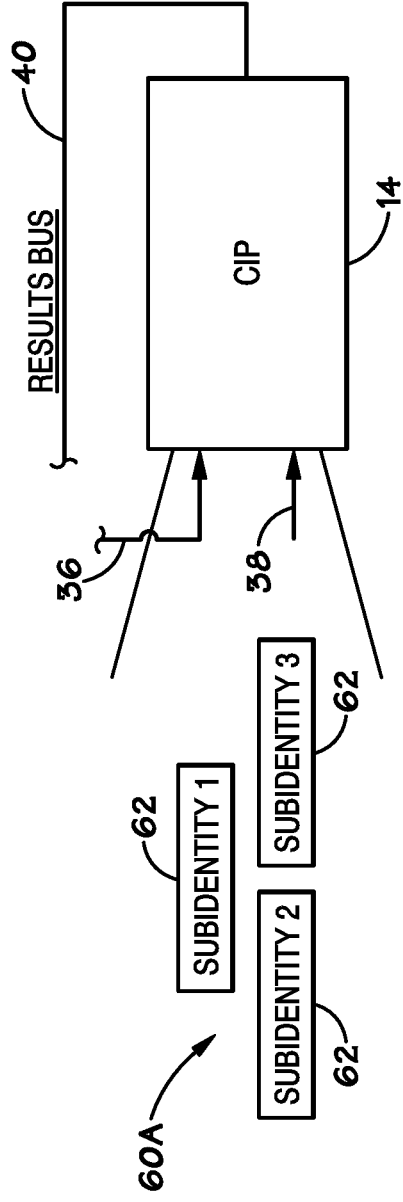
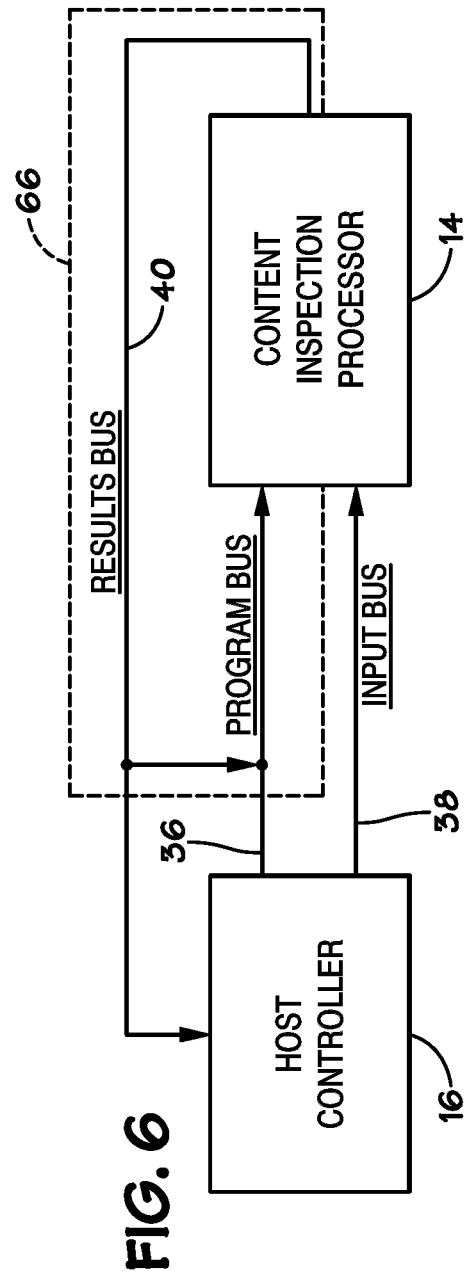
FIG. 5
FIG. 6

ADAPTIVE CONTENT INSPECTION

BACKGROUND

1. Field of Invention

Embodiments of the invention relate generally to content inspection processors, and, more specifically, to programming and operation of such processors.

2. Description of Related Art

In the field of computing, content inspection tasks are increasingly challenging. For example, pattern-recognition, a subset of content inspection tasks, may become more challenging to implement because of larger volumes of data and the number of patterns that users wish to identify. For example, spam or malware are often detected by searching for content, e.g., patterns in a data stream, such as particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, content inspection may slow the receipt of data.

Further, in many pattern recognitions, searches, or other content inspection tasks, the content inspection process is performed using (e.g., according to, against, with respect to, etc.) a fixed and defined set of search criteria. The device performing the content inspection process does not adjust to changes in input data and/or results data.

BRIEF DESCRIPTION OF DRAWINGS

FIG. 2 is a block diagram illustrating operation of a host controller and a content inspection processor in accordance with an embodiment of the present invention;

FIG. 3 is a flowchart of a dynamic adaptation process for a content inspection processor in accordance with an embodiment of the present invention;

FIG. 4 depicts a content inspection processor having adaptable programming according to an embodiment of the present invention;

FIG. 5 depicts a second level of adaptable programming of a content inspection processor according to an embodiment of the present invention;

FIG. 6 depicts a content inspection processor having integrated feedback in accordance with an embodiment of the present invention;

FIG. 8 depicts a dynamic adaptation process of a content inspection processor with integrated feedback in accordance with an embodiment of the present invention.

DETAILED DESCRIPTION

Figure 1:
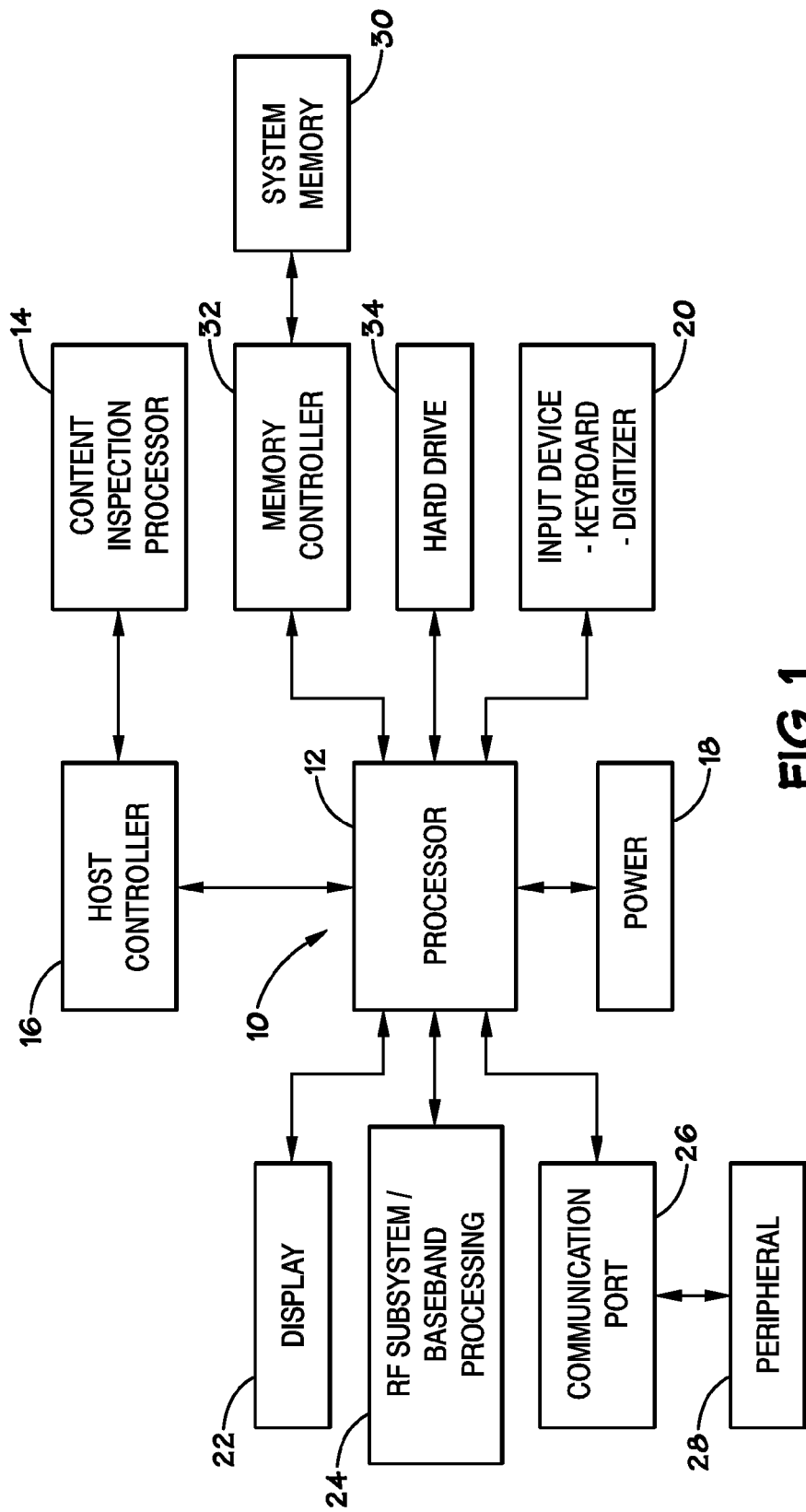
FIG. 1 is a block diagram of an embodiment of an apparatus having a content inspection processor in accordance with embodiments of the present invention.

FIG. 1 is a block diagram depicting an embodiment of an electronic apparatus, such as a device or system, generally designated by reference numeral 10. The apparatus 10 may be any of a variety of types such as a computer, pager, cellular phone, personal organizer, portable audio player, network device (e.g., router, firewall, switch, or any combination thereof), control circuit, camera, etc. The apparatus 10 may include apparatus processor 12, such as a microprocessor, to control the processing of functions and requests in the apparatus 10. Further, the processor 12 may comprise a plurality of processors that share apparatus control. The processor 12 may be a general purpose processor or a specifically designed processor for the functions and requests of the apparatus 10.

The apparatus 10 may also include a content inspection processor 14. The content inspection processor 14 may be one or more processors configured to inspect data using search criteria. For example, the content inspection processor 14 may be capable of using search criteria to match a pattern in a data set or a data stream provided to the content inspection processor 14. The content inspection processor 14 may be coupled to and controlled by processing logic, such as a host controller 16 that communicates with the content inspection processor 14 over one or more buses. The host controller 16 may program the content inspection processor 14 with search criteria or any other parameters used by the content inspection processor 14 during operation. The content inspection processor 14 may provide the primary or secondary functions of the apparatus 10. In one embodiment, the content inspection processor 14 may be a pattern-recognition processor as described in U.S. patent application Ser. No. 12/350,132.

The apparatus 10 typically includes a power supply 18. For instance, if the apparatus 10 is a portable system, the power supply 18 may advantageously include permanent batteries, replaceable batteries, and/or rechargeable batteries. The power supply 18 may also include an AC adapter, so the apparatus 10 may be plugged into a wall outlet, for instance. The power supply 18 may also include a DC adapter such that the apparatus 10 may be plugged into a vehicle cigarette lighter, for instance.

Various other devices may be coupled to the processor 12, depending on the functions that the apparatus 10 performs. For instance, an input device 20 may be coupled to the processor 12. The input device 20 may include buttons, switches, a keyboard, a light pen, a stylus, a mouse, and/or a voice recognition system, for instance. A display 22 may also be coupled to the processor 12. The display 22 may include an LCD, a CRT, LEDs, and/or any other suitable display, for example.

Furthermore, an RF sub-system/baseband processor 24 may also be coupled to the processor 12. The RF sub-system/baseband processor 24 may include an antenna that is coupled to an RF receiver and to an RF transmitter (not shown). A communications port 26 may also be coupled to the processor 12. The communications port 26 may be adapted to be coupled to one or more peripheral devices 28 such as a modem, a printer, a computer, or to a network, such as a local area network, remote area network, intranet, or the Internet, for instance.

Generally, memory is coupled to the processor 12 to store and facilitate execution of various programs. For instance, the processor 12 may be coupled to system memory 30 through a memory controller 32. The system memory 30 may include volatile memory, such as Dynamic Random Access Memory (DRAM) and/or Static Random Access Memory (SRAM). The system memory 30 may also include non-volatile memory, such as read-only memory (ROM), flash memory of various architectures (e.g., NAND memory, NOR memory, etc.), to be used in conjunction with the volatile memory. Additionally, the apparatus 10 may include a hard drive 34, such as a magnetic storage device.

FIG. 2 depicts operation of the host controller 16 and the content inspection processor 14 in accordance with an embodiment of the present invention. As shown in FIG. 2, the host controller 16 may communicate with the content inspection processor 14 over a program bus 36 and an input bus 38. The input bus 38 transfers the input data to be inspected by the content inspection processor 14. In some embodiments, the input data may be transferred as a fixed set of data (referred to as "static data") or streaming data (referred to as "dynamic data"). The input data may be received from any source, such as databases, sensors, networks, etc, coupled to the apparatus 10. For example, the input data may be received from another device or system in communication with the apparatus 10 over the communication port 26.

The program bus 36 transfers programming data from the host controller 16 to the content inspection processor 14. This program data is used to program the content inspection processor 14, with the operating parameters used during the inspection process. For example, in one embodiment the programming data may include search criteria (e.g., patterns or other criteria of interest) used by the content inspection processor 14, to match to the input data received over the input bus 38. The search criteria may include one or more patterns of any length and complexity.

The output of the content inspection processor 14 may be transferred over a results bus 40. The results bus 40 may provide the results data (e.g., search results) from processing of the input data by the content inspection processor 14 to the host controller 16. For example, in some embodiments the results data provided over the results bus 40 may indicate a match, may indicate "no match," and may include the particular search criteria that were matched and/or the location in the input data where the match occurred. In some embodiments, the content inspection processor 14 may notify the host controller 16 of any specific results data by transferring an output over the results bus 40.

In some embodiments, the input bus 38, program bus 36, and results bus 40 may be physically distinct buses, or any combination of the input bus 38, program bus 36, and results bus 40 may be physically implemented on a single bus interface. For example, in such an embodiment the single bus interface may be multiplexed or controlled via any suitable technique to transmit the different types of data provided to and received from the content inspection processor 14.

FIG. 3 depicts a dynamic adaptation process 44 for the content inspection processor 14 in accordance with an embodiment of the present invention. Initially, as shown in block 46, the content inspection processor 14 may receive input data (e.g., a data set or data stream), such as over the input bus 38. The content inspection processor 14 may identify information with respect to the input data provided to the content inspection processor 14 (block 48). Such information may include an identifying characteristic of the data, format of the data, a protocol of the data, and/or any other type of identifying information. After identifying information with respect to the input data, the information may be collected, analyzed, and used to adapt the search criteria and/or other operating parameters of the content inspection processor (block 50). For example, the host controller 16 or other processing logic may collect, analyze, and/or adapt the search criteria based on an identifying characteristic of the input data. The content inspection processor 14 may then be programmed with the adapted search criteria (block 52). Finally the content inspection processor 14 may inspect input data using the adapted search criteria (block 54). As described below, this process 44 may be iterative, so that additional identifying information may be found in the input data to allow for further adaptation of the search criteria (as shown by arrow 56).

FIGS. 4-6 depict different techniques for dynamic adaptive programming of the content inspection processor, to provide the content inspection processor the ability to adapt to the input data during run-time. Embodiments of the content inspection processor may include any one of or combination of the techniques described below in FIGS. 4-6.

FIG. 4 depicts the content inspection processor 14 having adaptable programming (e.g., search criteria) according to an embodiment of the present invention. As shown in FIG. 4, the content inspection processor 14 includes the ability to dynamically adapt search criteria based on identifying information with respect to the input data.

For example, FIG. 4 depicts an embodiment in which the content inspection processor 14 may receive many possible types of input data 60 (e.g., data sets or data streams). Each type of input data 60 may have different identifying information (depicted as identities 1, 2, 3, etc. in FIG. 4). For example, input data 60A may have identity 1, input data 60B may have identity 2, input data 60C may have identity 3, and so on. In one embodiment, for example, the content inspection processor 14 may perform natural language translation. Incoming input data 60 may include any possible natural language for translation by the content inspection processor. In such an embodiment, the identities may be different natural languages, such that identity 1 is French, identity 2 is Spanish, identity 3 is English, identity 4 is Russian, identity 5 is Polish, identity 6 is Mandarin Chinese, identity 7 is Japanese, etc.

The content inspection processor 14 may be programmed with search criteria to identify information with respect to the input data, such as by matching certain characteristics of the input data using the search criteria. Further, the content inspection processor 14 may be programmed with the search criteria based on the function of the content inspection processor 14 (e.g., natural language translation, network firewall, etc.) Thus, in an embodiment providing natural language translation, the content inspection processor 14 may be programmed to identify the natural language of the incoming input data 60. In such an embodiment, the content inspection processor 14 may not have enough memory to store all of the search criteria for each type of input data 60 (e.g., each possible natural language). After the input data 60 has been identified, the identity may be provided to the host controller 16 over the results bus 40. The host controller 16 may then adapt the search criteria based on the identify of the input data 60 and program the content inspection processor 14 with adapted search criteria for that specifically identified type of input data. For example, if the input data is identified as English, the search criteria may be adapted to match patterns of interest in English.

Further, any number of levels of adaptability may be provided by the content inspection processor 14. For example, FIG. 5 depicts an additional level of adaptability based on the identity of the input data. After identifying information with respect to the input data (such as identifying the input data 60A as "identity 1"), the content inspection processor 14 may be programmed with adapted search criteria to identify additional information (e.g., a sub-identity) with respect to of the input data 60A. As shown in FIG. 5, the input data 60A may have additional potentially identifying information 62, such as "sub-identity 1," "sub-identity 2," "sub-identity 3," etc. For example, in an embodiment identifying a specific natural language (e.g., identifying input data 60A as "English"), after identifying a language the content inspection processor 14 may then identify a regional dialect, accent, or other sub-identity of the identified language. Once the content inspection processor 14 has identified this sub-identity, this sub-identity may be provided to the host controller 14 over the results bus 40. The host controller 16 can then further adapt the search criteria and program the content inspection processor 14 with the further adapted search criteria. This process may repeat for any desired level of sub-identifiers of input data. Advantageously, successive adaptation of the search criteria described above enables the content inspection processor to achieve higher levels of accuracy for the inspection process.

In other embodiments, the identification of the input data may be used to enhance network security. For example, the content inspection processor 14 may identify code fragments in the input data that correspond to code fragments commonly found in close proximity to signatures of attack viruses, worms, or other malware. After such code fragments are identified, the host controller 16 may adapt the search criteria to match the attack signature known to be associated with such code fragments. These adapted search criteria may be provided to the content inspection processor 14 so that the content inspection processor 14 is better able to search for the respective attack signature associated with those code fragments, increasing accuracy of the inspection process.

In other embodiments, the identifying information searched for in the input data may be a network protocol, such as hypertext transfer protocol (HTTP), file transfer protocol (FTP), DNS request, etc. By identifying the protocol and providing this identity to the host controller 16, the host controller 16 may adapt search criteria for a specific protocol and program the content inspection processor 14 accordingly. In other embodiments, the identifying information (e.g., identity) searched for may be encoding/decoding information of the input data, where the identifying information of the input data is fed back to an encoder or decoder to adjust the encoding or decoding process. For example, a video or other media encoder may use the content inspection processor 14 to inspect the output of the encoding process and provide feedback to the encoder to enable the encoder to dynamically adapt the encoding process. In yet other embodiments, the identifying information may be any digitally encoded information.

In other embodiments, the content inspection processor 14 may include feedback mechanisms to provide dynamic adaptability to the content inspection processor 14 based on the input data. FIG. 6 depicts the content inspection processor 14 having integrated feedback in accordance with an embodiment of the present invention. As shown in FIG. 6, the results data from the content inspection processor 14 may be transferred over the results bus 40 into the program bus 36, creating a feedback loop 66. This feedback loop 66 may enable the content inspection processor 14 to dynamically adapt to the input data based on the results of an inspection process (e.g., based on the input data that matched or did not match search criteria programmed into the content inspection processor 14).

Figure 7:
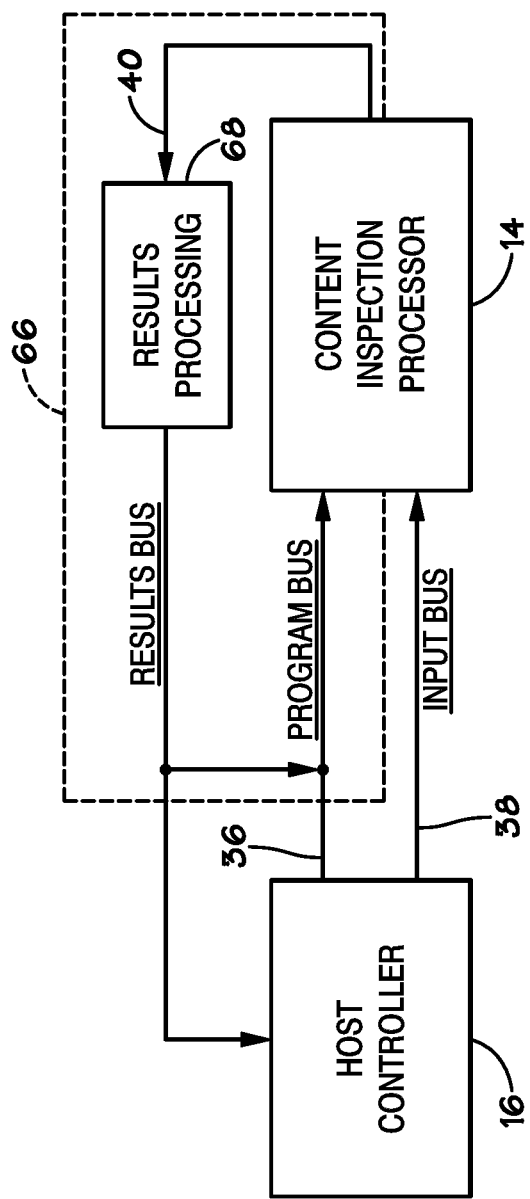
FIG. 7 depicts a content inspection processor having integrated feedback with results processing in accordance with another embodiment of the present invention.

In other embodiments, the feedback loop may include additional post-results processing. FIG. 7 depicts a content inspection processor 14 having integrated feedback with results processing in accordance with another embodiment of the present invention. As shown in FIG. 7, the results bus 40 from the content inspection processor 14 may be coupled to results processing logic 68. The results data output from the content inspection processor 14 may be processed by the results processing logic 68 before being provided to the program bus 36. The results processing logic 68 may include any suitable hardware and/or software logic, such as an additional content inspection processor to perform inspection of the results, a lookup operation to fetch new search criteria from local storage, etc.

FIG. 8 depicts a dynamic adaptation process 70 of a content inspection processor with integrated feedback in accordance with an embodiment of the present invention. Initially, the content inspection processor 14 receives input data (block 72), such as a data set or data stream received over the input bus 38. The input data may be inspected using to the search criteria programmed into the content inspection processor 14 (block 74). In some embodiments, as discussed above, this search criteria may be used to identify information with respect to the input data. In some embodiments, the results data of the inspection process may be provided to results processing logic 68 (block 76). The results data may be processed by the results processing logic 68 (block 78). The processed results data may be fed back into the content inspection processor 14, such as through the program bus 36 (block 80). As shown by arrow 82, the process 70 may continue to provide continuous feedback to the content inspection processor 14. In other embodiments, as also discussed above, the results data may be provided directly to the content inspection processor 14 without processing (as shown by arrow 84), such as by feeding the results data into the program bus 36.

What is claimed is:

1. An apparatus, comprising:
  a content inspection processor configured to inspect data using search criteria and to output results data corresponding to the inspected data;
  processing logic coupled to the content inspection processor;
  a first bus coupled between the content inspection processor and the processing logic, the first bus configured to receive results data from the content inspection processor and to provide results data to the processing logic;
  a second bus coupled between the processing logic and the content inspection processor, the second bus configured to receive an output from the processing logic and to provide the output to the content inspection processor, wherein the content inspection processor is programmed based on the output received from the second bus.

2. The apparatus of claim 1, wherein the first bus comprises a results bus coupled to the content inspection processor and the processing logic and configured to transfer the results data.

3. The apparatus of claim 1, further comprising an input bus coupled to the processing logic and the content inspection processor configured to provide input data to the content inspection processor.

4. The apparatus of claim 1, wherein the second bus comprises a program bus configured to transfer the output from the processing logic to the content inspection processor.

5. The apparatus of claim 3, wherein the content inspection processor is configured to identify information with respect to the input data.

6. The apparatus of claim 5, wherein the information corresponds to natural language, data format, protocol, or code fragment.

7. The apparatus of claim 5, wherein the results data comprises the information identified with respect to the input data.

8. The apparatus of claim 5, wherein the processing logic programs the content inspection processor, based on the information identified with respect to the input data.

9. The apparatus of claim 8, wherein the information identified with respect to the input data comprises first information, and wherein the content inspection processor is further configured to identify second information with respect to the input data after identification of the information.

10. The apparatus of claim 1, wherein the processing logic programs the content inspection processor with search criteria based on the results data.

11. An apparatus, comprising:
- a content inspection processor configured to inspect data using search criteria and to output results data corresponding to the inspected data;
- a results bus coupled to the content inspection processor and configured to receive the results data from the content inspection processor; and
- a program bus coupled to the content inspection processor, and configured to receive the results data from the results bus and to provide the results data to the content inspection processor;
- wherein the content inspection processor is configured to adapt the search criteria based on the results data received from the program bus.

12. The apparatus of claim 11, further comprising results processing logic coupled to the results bus and configured to process the results data, before providing the results data to the program bus.

13. The apparatus of claim 12, wherein the results processing logic comprises a second content inspection processor.

14. The apparatus of claim 11, further comprising an input bus coupled to the content inspection processor.

15. The apparatus of claim 14, wherein the results bus, the program bus, and the input bus comprise a single bus interface.

16. The apparatus of claim 14, wherein the results bus comprises a first bus interface, the program bus comprises a second bus interface, and the input bus comprises a third bus interface.

17. A method comprising:
- identifying information via a content inspection processor with respect to input data provided to the content inspection processor and using search criteria;
- outputting results data from the content inspection processor;
- providing the results data as feedback to the content inspection processor; and
- adapting the search criteria using the content inspection processor and based on the feedback results data.

18. The method of claim 17, wherein adapting the search criteria comprises receiving adapted search criteria from a processing logic coupled to the content inspection processor.

19. The method of claim 17, wherein identifying information via the content inspection processor with respect to the input data comprises identifying one of a natural language, a data format, a data protocol, or a code fragment.

20. The method of claim 17, further comprising identifying additional information with respect to the input data using the adapted search criteria.

21. The method of claim 20, further comprising further adapting the adapted search criteria using the additional information.

22. A method comprising:
- inspecting input data using a content inspection processor and based on search criteria;
- outputting results data from the content inspection processor;
- providing the results data as feedback to the content inspection processor; and
- adapting the search criteria using the content inspection processor and based on the feedback results data.

23. The method of claim 22, further comprising processing the results data before providing the results data as feedback.

24. The method of claim 23, wherein processing the results data comprises inspecting the results data using a second content inspection processor.

25. The method of claim 23, wherein inspecting the input data comprises inspecting the input data using search criteria and wherein processing the results data comprises fetching new search criteria.

26. The method of claim 22, wherein inspecting the input data comprises identifying information with respect to the input data.

27. A method, comprising:
- inspecting input data using a content inspection processor, wherein the content inspection processor uses an operating parameter during the inspecting;
- outputting results data from the content inspection processor;
- providing the results data as feedback to the content inspection processor;
- adapting the operating parameter using the content inspection processor and based on the results data; and
- inspecting the input data using the content inspection processor, wherein the content inspection processor uses the adapted parameter.

28. The method of claim 27, wherein the input data comprises a data set or a data stream.

* * * * *